(12) United States Patent
Quinn et al.

(10) Patent No.: US 11,320,082 B2
(45) Date of Patent: May 3, 2022

(54) SEALING ELEMENT

(71) Applicant: QINOV8 UK LTD, Durham (GB)

(72) Inventors: Michael Quinn, Tyne and Wear (GB); Mark Quinn, Tyne and Wear (GB)

(73) Assignee: QINOV8 UK LTD, Durham (GB)

( * ) Notice: Subject to any disclaimer, the term of this patent is extended or adjusted under 35 U.S.C. 154(b) by 46 days.

(21) Appl. No.: 16/612,595

(22) PCT Filed: May 11, 2018

(86) PCT No.: PCT/GB2018/051278
§ 371 (c)(1),
(2) Date: Nov. 11, 2019

(87) PCT Pub. No.: WO2018/206976
PCT Pub. Date: Nov. 15, 2018

(65) Prior Publication Data
US 2020/0199967 A1    Jun. 25, 2020

(30) Foreign Application Priority Data

May 11, 2017  (GB) ...................................... 1707552
Oct. 13, 2017  (WO) ................ PCT/GB2017/053100

(51) Int. Cl.
*F16L 55/16*   (2006.01)
*F16L 55/162*  (2006.01)
*B29C 48/18*   (2019.01)
*B29B 9/12*    (2006.01)
*B29B 9/16*    (2006.01)
*E21B 33/138*  (2006.01)
(Continued)

(52) U.S. Cl.
CPC ............ *F16L 55/1612* (2013.01); *B29B 9/12* (2013.01); *B29B 9/16* (2013.01); *B29C 48/18* (2019.02); *E21B 33/138* (2013.01); *F16L 55/164* (2013.01); *B29B 2009/163* (2013.01); *C09J 163/00* (2013.01)

(58) Field of Classification Search
CPC . F16L 55/1612; F16L 55/164; F16L 55/1645; E21B 33/138
USPC ............................... 405/184.1; 277/314, 316
See application file for complete search history.

(56) References Cited

U.S. PATENT DOCUMENTS 2,754,910 A * 7/1956 Derrick .................... C09K 8/60
                                                            166/284
2,933,136 A * 4/1960 Ayers .................... E21B 33/138
                                                            166/284

(Continued)

FOREIGN PATENT DOCUMENTS

EP          3640517 A1 *  4/2020  .......... F16L 55/1003
GB          2465487 A  *  5/2010  ............ E21B 33/138
WO    WO-2018206905 A1 * 11/2018  ............. B29C 48/18

*Primary Examiner* — Frederick L Lagman
(74) *Attorney, Agent, or Firm* — Culhane Meadows PLLC; Robert C. Klinger

(57) ABSTRACT

A sealing element (10) for use in a fluid-carrying pipeline (16) comprising a substantially central core (14) surrounded by a coating (12). The outer coating (12) is adapted to perform a partial extrusion through an opening (15) in a pipeline wall (16) to seal the opening (15). The density of the sealing element (10) is substantially the same as the density of the fluid (11) in the pipeline (16). The coating (12) comprises a two-part epoxy putty, and the core (14) is formed from a deformable material. A method of making the sealing element is also disclosed.

16 Claims, 4 Drawing Sheets

(51) Int. Cl.
*F16L 55/164* (2006.01)
*C09J 163/00* (2006.01)

(56) References Cited

U.S. PATENT DOCUMENTS

| | | | | |
|---|---|---|---|---|
| 3,144,049 A * | 8/1964 | Ginsburgh | ............ | G01M 3/202 138/97 |
| 4,102,401 A * | 7/1978 | Erbstoesser | ........... | E21B 33/138 166/284 |
| 4,195,001 A * | 3/1980 | Lytton | .................... | C08G 59/18 523/177 |
| 4,244,425 A * | 1/1981 | Erbstoesser | ........... | E21B 43/261 166/193 |
| 4,407,368 A * | 10/1983 | Erbstoesser | ........... | C09K 8/516 166/284 |
| 4,505,334 A * | 3/1985 | Doner | ................... | E21B 33/138 156/170 |
| 5,253,709 A * | 10/1993 | Kendrick | ............. | E21B 33/138 166/193 |
| 5,990,051 A * | 11/1999 | Ischy | ..................... | E21B 43/261 507/204 |
| 7,647,964 B2 * | 1/2010 | Akbar | ................... | E21B 33/138 166/193 |
| 8,061,389 B2 * | 11/2011 | McEwan | ................ | F16L 55/162 138/98 |
| 2007/0169935 A1* | 7/2007 | Akbar | ................... | E21B 33/138 166/284 |
| 2011/0024988 A1* | 2/2011 | Ryan | ........................ | C09K 3/12 277/316 |
| 2011/0198812 A1* | 8/2011 | Ryan | ........................ | F16L 55/162 277/314 |
| 2011/0221137 A1* | 9/2011 | Obi | ....................... | F16L 55/164 277/316 |
| 2012/0067447 A1* | 3/2012 | Ryan | .................... | E21B 33/138 138/97 |
| 2015/0114507 A1* | 4/2015 | Warren | ............... | F16L 55/1645 138/98 |
| 2015/0292293 A1* | 10/2015 | Tolman | ................. | E21B 33/134 166/250.01 |
| 2017/0122481 A1* | 5/2017 | Czaplewski | .......... | F16L 55/164 |

* cited by examiner

SEALING ELEMENT

FIELD OF THE INVENTION

The present invention relates to apparatus for sealing leaks in fluid-carrying ducts or pipelines.

BACKGROUND OF THE INVENTION

Pipes carrying fluid, such as water, are usually located underground. Leaks in water pipes can lead to reduced pressure in the pipeline as well as potential contamination of the water being carried in the pipes.

It is known from EP2902690 to use an untethered, sphere-shaped sensor unit adapted to roll along the interior surface of a water-carrying pipeline. The sensor unit uses acoustic sensors to detect leaks and record their location, so that they can be investigated and repaired from the surface.

It is known from GB2465487 to both detect and seal leaks in oil pipelines using remote sealing elements which are deployed upstream of the leak and carried to the leak site in the fluid within the pipe. The sealing elements are designed such that they are drawn into the defect and subsequently seal the leak by blocking the hole. In one embodiment, the sealing elements comprise a malleable thixotropic putty which changes state over time from malleable to substantially solid. The sealing element is deployed part way through the curing process so that it undergoes a slow extrusion through the defect in the pipe, while completing the curing process to form a plug in the defect. In another embodiment, the sealing elements comprise a solid core surrounded by an outer coating of thixotropic putty. The malleable coating extrudes through the defect and draws the solid core into a sealing engagement with the hole. As the coating cures the hard core is held in position and prevented from falling out of the leak.

Sealing elements of the type described in GB2465487 are deployed remotely and pulled into the defect due to the pressure differential which exists at the leak site. It would be desirable to provide a buoyant sealing element which is more easily drawn into defects located along the pipeline.

SUMMARY OF THE INVENTION

Accordingly, a first aspect of the invention provides a sealing element for use in a fluid-carrying pipeline comprising a substantially central core surrounded by a coating which is adapted to perform partial extrusion through an opening in a pipeline wall to seal the opening, wherein the density of the sealing element is substantially the same as the density of the fluid in the pipeline, and wherein the coating comprises a two-part epoxy putty, and wherein the core is formed from a deformable material.

Alternatively, each part of the two-part epoxy putty may be present as a discrete element within the coating, or each part of the two-part epoxy putty may be provided in a separate layer.

One of the first and second parts of the two-part epoxy putty may be provided in a layer around the central core with the other of the first and second parts of the two-part epoxy putty being in the form of granules or particles disposed throughout or in the surface of said layer around the central core.

Preferably, the core is buoyant and preferably the density of the core is less than the density of the fluid in the pipeline.

The core may be hollow, for example the core may be a hollow sphere filled with air. Alternatively, the core may be fabricated from a buoyant material. A suitable example material is expanded polystyrene.

Preferably the fluid in the pipeline is water and the core has a density of less than 1 g/cm$^3$.

Preferably the coating comprises a thixotropic putty.

The coating may be provided with a protective outer membrane. Preferably the outer membrane is fabricated from an elastomeric material such as rubber or latex. Preferably the outer membrane is flexible.

A second aspect of the invention provides a method of making a sealing element as hereinbefore defined, the method comprising the steps of:
 a) providing an elongate cylindrically shaped piece of two-part epoxy putty;
 b) cutting the cylinder into a number of portions;
 c) rolling each portion into a sphere shape substantially without mixing the two parts of the two-part putty;
 d) thoroughly mixing, via manual kneading, the two parts of one portion of the putty; and
 e) shaping the mixed putty around the deformable central core to form a substantially sphere-shaped sealing element.

Advantageously, the length of each portion in step b) is at least one fifth as long as the diameter of the cylinder.

Preferably, step d) includes flattening the sphere shaped portion of two-part epoxy putty and folding the resultant flattened sphere over on itself and repeating the flattening and folding process a number of times to achieve a through mixing of the two parts of the two-part epoxy putty.

Preferably, the method further comprises the additional step of rolling each portion from step b) into a cylinder with a reduced diameter and then repeating step b) on the cylinder of reduced diameter to form smaller portions of two-part epoxy putty.

A third aspect of the invention provides a kit of parts for preparation of a sealing element as hereinbefore defined, the kit comprising a sphere of two-part epoxy putty, wherein each part of the two-part epoxy putty is present as a discrete element within the sphere, and a core fabricated from a deformable material. Preferably the core is sphere-shaped.

Advantageously, the kit of parts further includes a set of instructions, the instructions defining the method steps d) and e) as hereinbefore defined.

Advantageously, the set of instructions further defines a method of sealing a defect in a fluid-filled pipeline as defined herein.

A fourth aspect of the invention provides a method of sealing a defect in a fluid-filled pipeline comprising the steps of:
 i) introducing a sealing element as hereinbefore defined into the pipeline upstream of the defect;
 ii) allowing the sealing element to be transported to the defect by the fluid contained within the pipeline; and
 iii) allowing the sealing element to at least partially extrude through the defect and to cure; wherein a part of the sealing element forms a solid plug located within the defect after extrusion through the defect and curing of the sealing element.

Preferably, the time taken for the part of the sealing element to cure is in the region of 10 to 20 minutes.

Preferably, the core of the sealing element does not come into sealing engagement with the defect.

The a part of the core may extend into the defect, there being putty situated between the core and the defect.

The core may be deformed as the putty is drawn into the defect.

Preferably, the pipeline is substantially free of air.

The pipeline may be downstream of a water meter and the method may include the step of turning a stop cock associated with the water meter off, removing a closure component from and opening of the pipeline that allows access to the inside of the pipeline, inserting a sealing element into the pipeline through the opening, replacing the closure apparatus and turning the stop cock off to allow fluid to flow in the pipeline down stream of the stop cock. This provides the advantage that when the sealing element is in the pipeline the pipeline is full of fluid. It is advantageous that there is not significant air in the pipeline.

The sealing element of the invention has a density less than or equal to the density of the fluid through which it is to travel, meaning that it is buoyant in that fluid. The buoyancy provides an improved sealing element which is more easily drawn into defects within a pipeline.

BRIEF DESCRIPTION OF THE DRAWINGS

In the drawings, which illustrate a preferred embodiment of the apparatus of the invention, and are by way of example.

DETAILED DESCRIPTION OF THE PREFERRED EMBODIMENTS OF THE INVENTION

Figure 1:
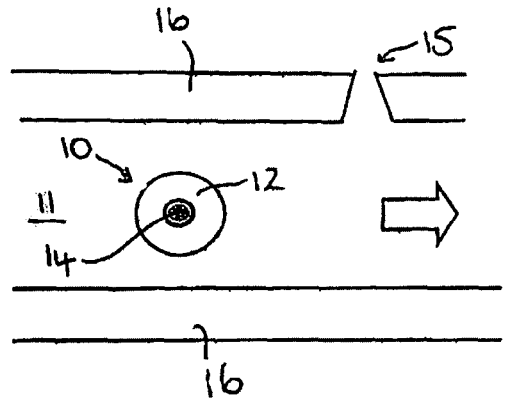
FIG. 1 is a schematic cross-sectional view of an example of a sealing element of the invention approaching a leak site in a pipe.

FIG. 1 illustrates a cross-sectional view of an example of a substantially spherical sealing element 10 according to a first embodiment of the invention, shown inside a pipeline 16, in which there is a defect or hole 15.

The sealing element 10 includes a buoyant core 14 surrounded by a coating of epoxy putty 12. The putty changes state over time from malleable to substantially solid.

In this example, the buoyant core 14 is a polystyrene sphere with a diameter of between 1 mm and 5 mm. The total diameter of the sealing element is preferably in the range 5 to 10 mm.

A fluid 11, typically water, flows along the pipeline 16 in the direction of the arrow. The sealing element 10 is deployed into the pipeline 16 upstream of the hole 15. The sealing element 10 has a density substantially equal to the fluid being carried by the pipeline 16, meaning that the sealing element 10 travels easily along with the fluid 11.

The putty 12 comprises a two-part epoxy resin and the two parts must be mixed together to initiate the change in state from malleable to substantially solid. Two-part epoxy resins are commercially available. A preferred example of a two-part epoxy resin comprises bisphenol A and 2,4,6-tris (dimethylaminomethyl)phenol. An example of a suitable commercially available epoxy putty has a specific gravity of 1.7. In FIG. 1 the putty 12 is shown after mixing.

Figure 5:
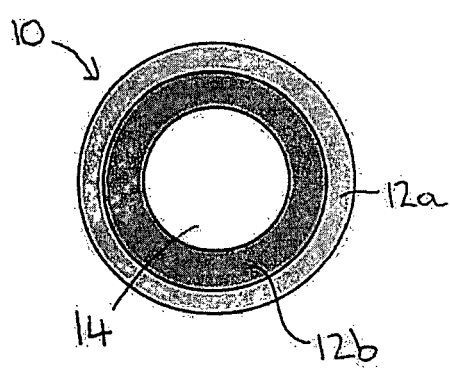
FIG. 5 illustrates a cross-sectional view through a sealing element according to an embodiment of the invention.

FIG. 5 illustrates an example of a sealing element before the two parts are mixed together. In this example, each part of the two-part epoxy resin is present in a separate layer 12a, 12b surrounding the core 14. The two layers are mixed by manual kneading of the sealing element 10 for 15 to 20 seconds prior to deployment into the pipeline 16. Mixing of the two layers 12a, 12b starts the curing process. Preferably the putty 12 cures in around 15 to 20 minutes after the initial kneading.

Figure 7:
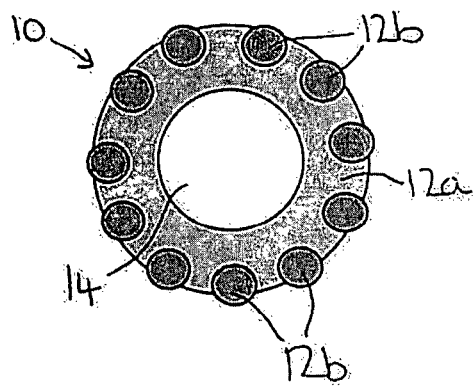
FIG. 7 illustrates a cross-sectional view through a sealing element according to another embodiment of the invention.

Alternatively, as shown in FIG. 7, one part 12b of the two-part epoxy resin may be dispersed through the other part 12a of the two-part epoxy resin, for example in the form of a number of granules. As with the example shown in FIG. 5, the two parts of the epoxy resin are combined by manual kneading to form a coating 12 in which both parts 12a and 12b of the putty 12 are combined.

Figure 2:
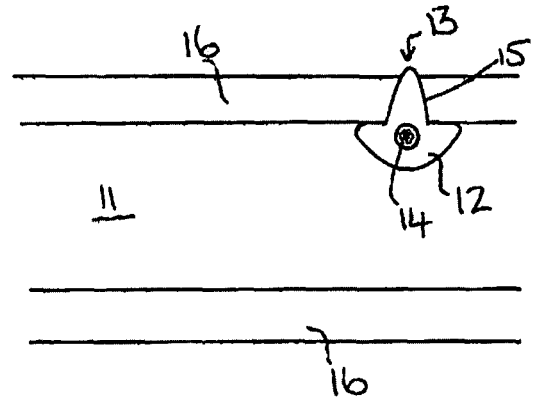
FIG. 2 is a schematic view of the sealing element of FIG. 1 when partially extruded through the leak site in the pipe.

The sealing element 10 is deployed when the putty 12 is combined and malleable. It is carried along the pipeline 16 by the fluid 11 towards the hole 15. The pressure differential at the hole 15 pulls the sealing element 10 towards the leak site. Since the putty 12 is in a malleable state it undergoes a slow extrusion into the hole 15. When the curing process is completed, the sealing element forms a permanent plug 13 in the hole 15 as shown in FIG. 2. The putty 12 also exhibits adhesive properties which help the sealing element 10 to bond to the surfaces of the pipeline 16 around the hole 15. Whilst not shown in the drawings, as the sealing element 10 changes shape as a result of the putty extruding through the hole, the deformable core may change shape. A part of the deformable core may extend into the hole. In this scenario the is nevertheless putty 12 situated between the edge of the hole and the core and surrounding the core.

Figure 4:
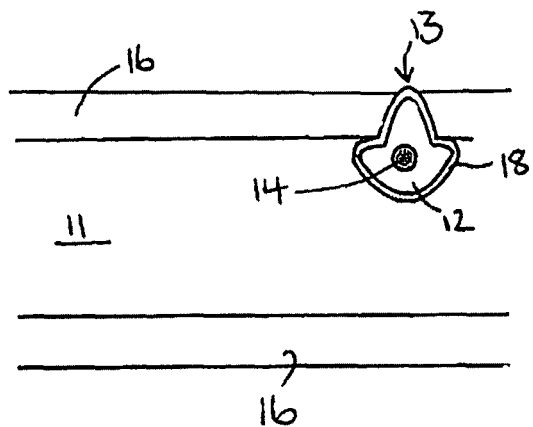
FIG. 4 is a schematic view of the sealing element of FIG. 3 when partially extruded through the leak site in the pipe.

As shown in FIGS. 2 and 4 it is the coating 12 and not the core 14 which forms the seal in the pipeline 16, sealing the hole 15.

Figure 3:
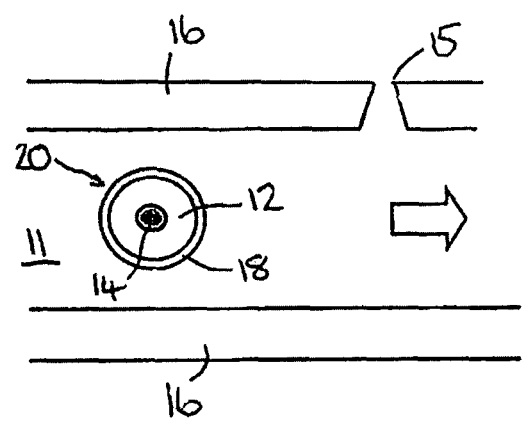
FIG. 3 is a schematic cross-sectional view of a sealing element according to a further embodiment of the invention approaching a leak site in a pipe.

FIG. 3 illustrates another embodiment of the invention in which the sealing element 20 includes an outer membrane 18 over the putty 12. The outer membrane 18 is preferably elastomeric, and may be a thin layer of rubber or latex with a thickness of approximately 0.1 mm. The outer membrane 18 may be applied by dipping the putty 12 into a liquid coating composition which air dries to form the coating 18. Where present, the outer membrane 18 protects the putty layer 12 of the sealing element 20 both before deployment and during deployment of the sealing element 20 in the pipeline 16. The outer membrane 18 needs to be flexible so that it extrudes through the hole along with the putty layer 12. Typically, the outer membrane 18 breaks as the sealing element is pulled into the leak.

As with the previous embodiment, the putty 12 comprises a two-part epoxy resin and the two parts must be mixed together to initiate the change in state from malleable to substantially solid. In FIG. 3 the putty 12 is shown after mixing.

Figure 6:
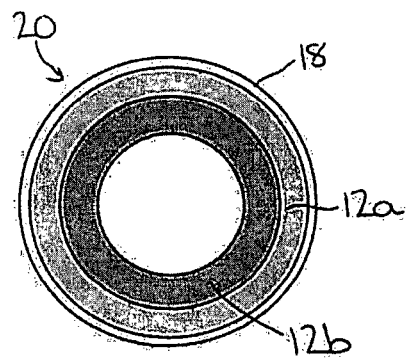
FIG. 6 illustrates a cross-sectional view through a sealing element according to another embodiment of the invention.

FIG. 6 illustrates an example of the sealing element 20 before mixing. In this example, each part of the two-part epoxy resin is present in a separate layer 12a, 12b surrounding the core 14. The outer layer 12a is covered by the outer membrane 18. As with the previous embodiment, the two layers are mixed by manual kneading of the sealing element 10 for 15 to 20 seconds prior to deployment into the pipeline 16. Mixing of the two layers 12a, 12b starts the curing process. Preferably the putty 12 cures in around 15 to 20 minutes after the initial kneading.

Figure 8:
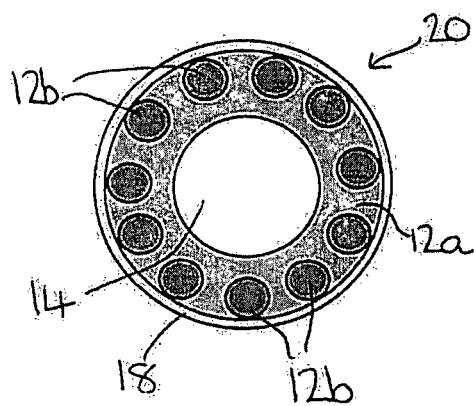
FIG. 8 illustrates a cross-sectional view through a sealing element according to another embodiment of the invention.

Alternatively, as shown in FIG. 8, one part 12b of the two-part epoxy resin may be dispersed through the other part 12a of the two-part epoxy resin in the form of a number of granules. The outer membrane 18 covers both parts 12a, 12b of the epoxy resin. As with the example shown in FIG. 6, the two parts of the epoxy are combined by manual kneading to form a coating 12 in which both parts 12a and 12b of the putty are combined.

Figure 9:
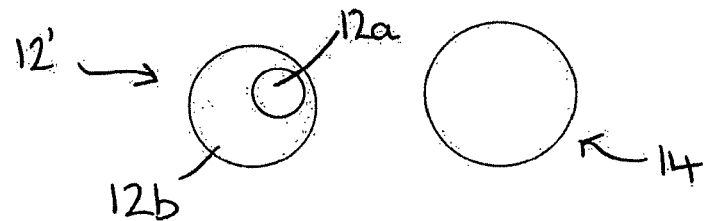
FIG. 9 illustrates a kit of parts.

In an alternative embodiment of the invention, the sealing element is provided in kit form as illustrated in FIG. 9, the kit including a sphere-shaped piece of the two-part epoxy resin 12', with the two parts 12a, 12b present as discrete elements within the sphere, and a sphere-shaped core 14 made of a deformable material such as polystyrene. The sealing element is then formed immediately prior to use by first manually kneading the sphere-shaped piece of two-part epoxy resin 12 in order to thoroughly mix the two parts 12a, 12b, and then shaping the kneaded resin 12 into a coating around the core 14 to form the sealing element 10. The sealing element 10 is then deployed into the pipeline. The process of kneading the sphere-shaped piece of two-part epoxy resin 12 may comprise the steps of first flattening the sphere, then folding the resultant flattened sphere over on itself, for example in half, and repeating the flattening and folding process a number of times (for example between 4 and 20 times) to achieve a through mixing of the two parts 12a, 12b.

Figure 10:
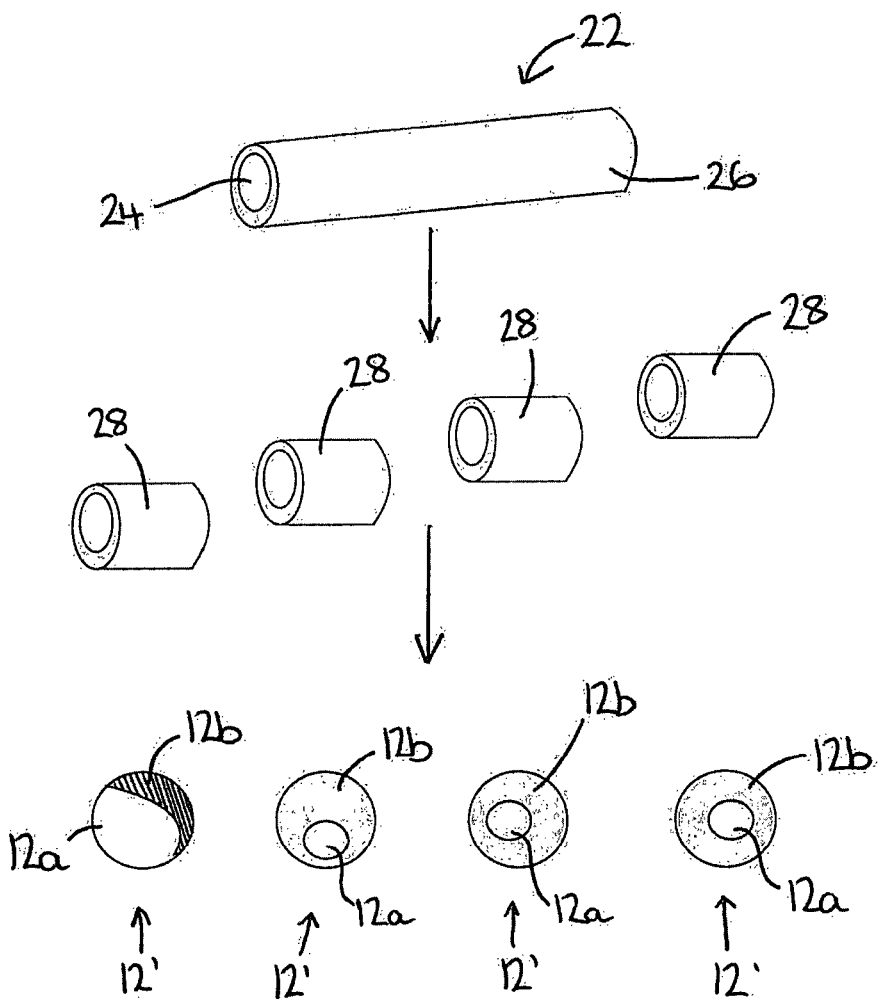
FIG. 10 illustrates a method for making a part of the sealing element of the invention.

FIG. 10 illustrates how the sphere-shaped piece of two-part epoxy resin 12' may be formed. Two-part epoxy resin is commercially available in the form of a cylinder 22 in which the central part 24 of the cylinder is formed from one part of the resin and the outer layer 26 of the cylinder is formed from the other part of the two-part resin, typically the hardener compound. To form the sphere-shaped piece of two-part epoxy resin 12', the cylinder 22 is first cut into a number of portions 28. The length of each portion is advantageously at least one fifth as long as the diameter of the cylinder 22. Each portion 28 may then be gently rolled into a sphere shape 12', maintaining the two-parts 12a, 12b of the resin within the sphere, for inclusion in the kit of FIG. 9. The length of each portion may be substantially equal to the diameter of the cylinder 22 or between one fifth and one and a half times as long as the diameter of the cylinder 22.

Figure 11:
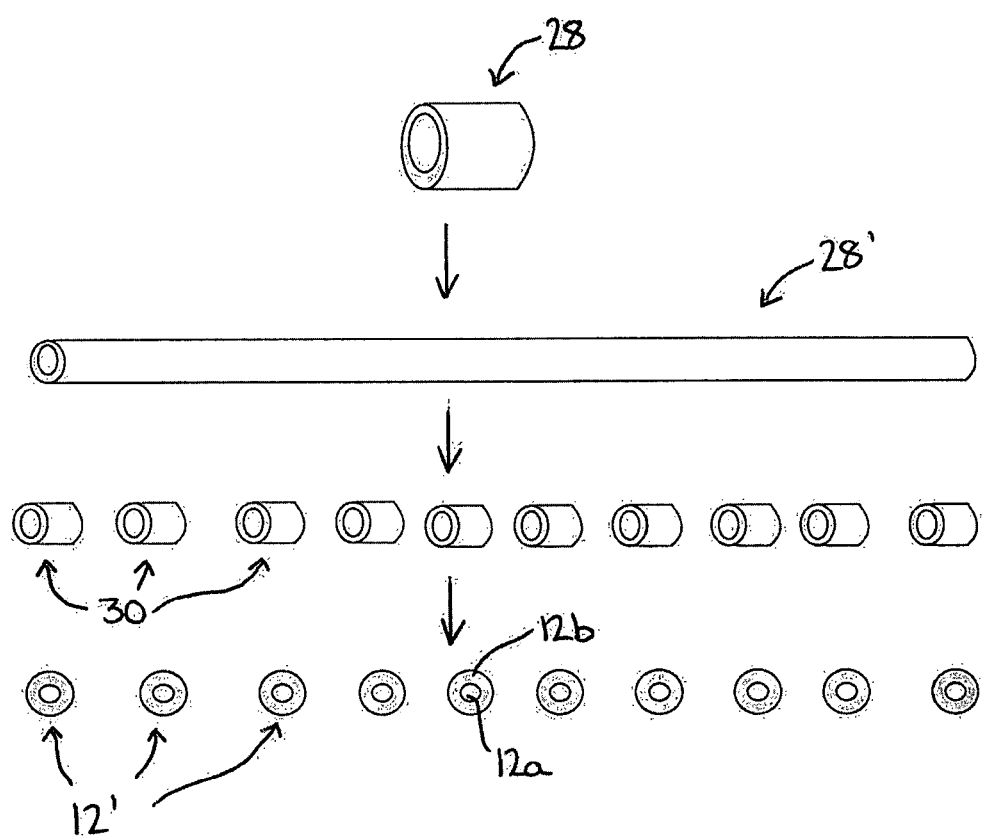
FIG. 11 illustrates a method for making a part of the sealing element of the invention.

As illustrated in FIG. 11, where a smaller sealing element is required, each portion 28 of two-part epoxy resin can be further rolled to make an elongate cylinder 28' with a reduced diameter. The cylinder 28' is then further cut into portions 30 which may then be rolled gently to form spheres 12', maintaining the two-parts 12a, 12b of the resin within the sphere.

For a flow rate of fluid in a pipeline of between 4 and 10 litres per minute the core 14 would typically have a diameter of approximately 3 mm and the coating 12 comprises approximately 0.2 g of a 50:50 mix of the two-part epoxy putty.

For a flow rate of fluid in a pipeline of between 10 and 15 litres per minute the core 14 would typically have a diameter of approximately 4 mm and the coating 12 comprises approximately 0.3 g of a 50:50 mix of the two-part epoxy putty.

For a flow rate of fluid in a pipeline of between 15 and 20 litres per minute the core 14 would typically have a diameter of approximately 5 mm and the coating 12 comprises approximately 0.4 g of a 50:50 mix of the two-part epoxy putty.

The invention claimed is:

1. A sealing element for use in a fluid-carrying pipeline, the sealing element comprising a substantially central core surrounded by a coating which is adapted to perform partial extrusion through an opening in a pipeline wall to seal the opening, wherein the density of the sealing element is substantially the same as the density of the fluid in the pipeline, and wherein the coating comprises a two-part epoxy putty, and wherein in use the core does not come into sealing engagement with the opening.

2. A sealing element according to claim 1, wherein the density of the core is less than the density of the fluid in the pipeline.

3. A sealing element according claim 1, wherein the core is hollow.

4. A sealing element according to claim 1, wherein the core is fabricated from a buoyant material.

5. A sealing element according to claim 4, wherein the core is polystyrene.

6. A sealing element according to claim 1, wherein the core is substantially spherical in shape.

7. A sealing element according to claim 1, wherein the two parts of the two-part putty are bisphenol A and 2,4,6-tris (dimethylaminomethyl)phenol.

8. A sealing element according to claim 1, wherein the proportion of one part of the two-part putty to the other of two-part putty is 1:1.

9. A sealing element according to claim 1, wherein the core is formed from a deformable material.

10. A method of making a sealing element according to claim 1, the method comprising the steps of:
    a) providing an elongate cylindrically shaped piece of two-part epoxy putty;
    b) cutting the cylinder into a number of portions;
    c) rolling each portion into a sphere shape substantially without mixing the two parts of the two-part putty;
    d) thoroughly mixing, via manual kneading, the two parts of one portion of the putty; and
    e) shaping the mixed putty around the deformable central core to form a substantially sphere-shaped sealing element.

11. A method according to claim 10, wherein the length of each portion is at least one fifth as long as the diameter of the cylinder.

12. A method according to claim 11, further comprising the additional step of rolling each portion from step b) into a cylinder with a reduced diameter and then repeating step b) on the cylinder of reduced diameter to form smaller portions of two-part epoxy putty.

13. A method according to claim 10 wherein step d includes flattening the sphere shaped portion of two-part epoxy putty and folding the resultant flattened sphere over on itself and repeating the flattening and folding process a number of times to achieve a through mixing of the two parts of the two-part epoxy putty.

14. A method of sealing a defect in a fluid-filled pipeline comprising the steps of:
    i) introducing a sealing element comprising a substantially central core surrounded by a coating which is adapted to perform partial extrusion through an opening in a pipeline wall to seal the opening, wherein the density of the sealing element is substantially the same as the density of the fluid in the pipeline, and wherein the coating comprises a two-part epoxy putty, and wherein in use the core does not come into sealing engagement with the opening into the pipeline upstream of the defect;

ii) allowing the sealing element to be transported to the defect by the fluid contained within the pipeline; and iii) allowing the sealing element to at least partially extrude through the defect and to cure;

wherein a part of the sealing element forms a solid plug located within the defect after extrusion through the defect and curing of the sealing element and wherein the core of the sealing element does not come into sealing engagement with the defect.

15. A method according to claim 14, wherein the time taken for the sealing element to cure is in the region of 10 to 20 minutes.

16. A method according to claim 14, wherein the pipeline is substantially free of air.

\* \* \* \* \*